United States Patent [19]

Overfield

[11] Patent Number: 5,411,054
[45] Date of Patent: May 2, 1995

[54] POSITIVE DISPLACEMENT COMPRESSOR

[76] Inventor: Norbert W. Overfield, 20029 S. Center St., Corry, Pa. 16407

[21] Appl. No.: 243,265

[22] Filed: May 16, 1994

Related U.S. Application Data

[60] Division of Ser. No. 973,210, Nov. 6, 1992, Pat. No. 5,311,902, which is a continuation-in-part of Ser. No. 731,154, Jul. 2, 1991, abandoned.

[51] Int. Cl.$^6$ ............................................. F04B 53/10
[52] U.S. Cl. .................... 137/512.1; 137/516.13; 137/516.15; 137/516.27; 251/334
[58] Field of Search ............ 137/512.1, 516.11, 516.13, 137/516.15, 516.17, 516.19, 516.21, 516.23, 516.25, 516.27, 516.29, 538; 251/334; 417/569, 572

[56] References Cited

U.S. PATENT DOCUMENTS

| | | |
|---|---|---|
| 17,503 | 6/1857 | Hyde et al. ............... 137/516.15 X |
| 1,746,856 | 2/1927 | French ...................... 239/533.9 |
| 1,986,944 | 1/1935 | Schoene ................... 137/516.13 |
| 2,036,799 | 6/1935 | Duryee ..................... 137/516.15 X |
| 2,344,818 | 3/1944 | Hutton ...................... 137/512.1 |
| 2,445,923 | 6/1948 | Paxman ................... 239/533.9 X |
| 2,570,698 | 10/1951 | Manseau .................. 417/269 |
| 2,624,587 | 1/1953 | Watson ..................... 137/538 X |
| 2,868,443 | 1/1959 | Dolza ........................ 417/269 X |
| 2,946,552 | 7/1960 | Mancusi, Jr. ............. 251/334 X |
| 2,981,282 | 4/1961 | Mack ......................... 137/516.29 |
| 3,016,837 | 1/1962 | Dlugos ...................... 417/269 |
| 3,018,737 | 1/1962 | Cook et al. ................ 417/269 X |
| 3,212,520 | 10/1965 | Carlton ..................... 137/493.1 |
| 3,378,030 | 4/1968 | Cary ......................... 137/516.29 |
| 3,536,094 | 10/1970 | Manley, Jr. ............... 137/512.1 |
| 3,552,886 | 1/1971 | Olson, Jr. ................. 417/269 |
| 3,749,523 | 7/1973 | Wahl, Jr. .................. 417/269 |
| 3,879,942 | 4/1975 | Dorn et al. ............... 60/245 |
| 4,049,014 | 9/1977 | Johnson et al. .......... 137/315 |
| 4,065,058 | 12/1977 | Knape et al. ............. 239/88 |
| 4,106,816 | 8/1978 | August ...................... 301/108.1 |
| 4,151,958 | 5/1979 | Hofmann .................. 239/533.3 |
| 4,278,106 | 7/1981 | Cunningham ............ 137/512.1 |
| 4,307,751 | 12/1981 | Mayer et al. ............. 137/512.1 |
| 4,373,550 | 2/1983 | Yelich ....................... 137/516.29 |
| 4,401,414 | 8/1983 | Ishizuka ................... 417/269 |
| 4,447,638 | 10/1983 | Sasaya et al. ............. 417/269 |
| 4,465,237 | 8/1984 | Kupper ..................... 239/533.3 |
| 4,570,853 | 2/1986 | Schmied ................... 239/116 |
| 4,705,068 | 11/1987 | Hartshorn ................. 137/512.1 |
| 4,770,206 | 9/1988 | Sjoberg ..................... 137/516.29 |
| 4,852,608 | 8/1989 | Bennitt ...................... 137/516.13 |
| 4,915,354 | 4/1990 | Sims, Jr. et al. ........... 251/334 |

FOREIGN PATENT DOCUMENTS

| | | | |
|---|---|---|---|
| 930835 | 7/1955 | Germany ............... | 137/516.11 |
| 0064146 | 5/1981 | Germany . | |
| 570955 | 12/1957 | Italy .......................... | 137/538 |

*Primary Examiner*—John Rivell
*Attorney, Agent, or Firm*—Hodgson, Russ Andrews, Woods & Goodyear

[57] ABSTRACT

A reciprocating positive displacement compressor is described. The positive displacement compressor has an intake or exhaust valve provided with a deformable seal means, such as a Belleville spring, that makes edge or area contact with a valve seat in the closed condition of the valve.

13 Claims, 3 Drawing Sheets

NOT STRESSED

STRESSED FLAT

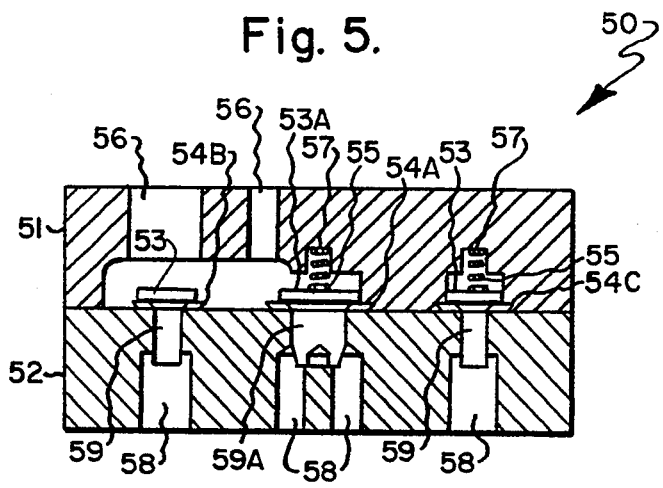
Fig. 5.
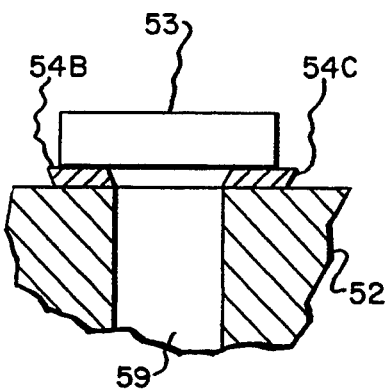
Fig. 8.
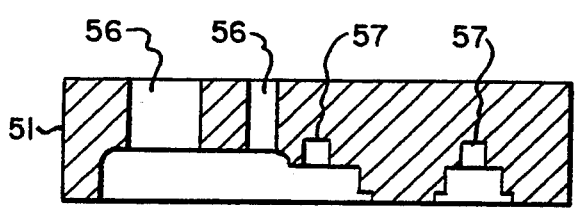
Fig. 6.
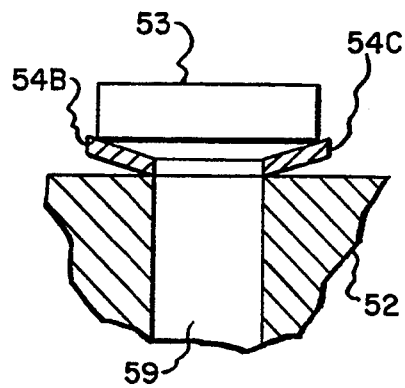
Fig. 9.
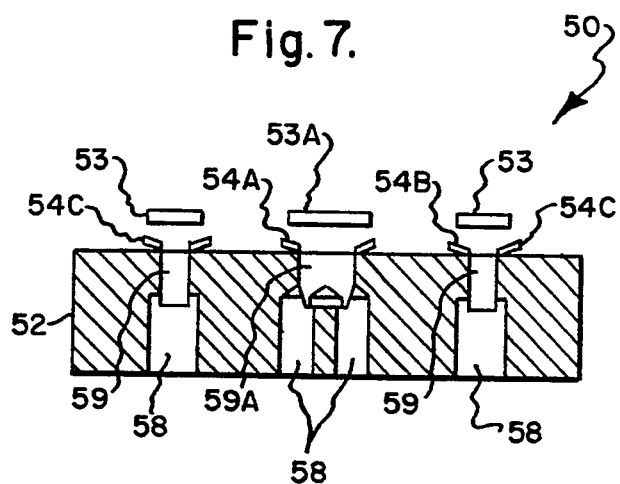
Fig. 7.
Fig. 10.

POSITIVE DISPLACEMENT COMPRESSOR

BACKGROUND OF THE INVENTION

This application is a divisional of application Ser. No. 07/973,210, filed Nov. 6, 1992, now U.S. Pat. No. 5,311,902, which is a Continuation-In-Part of application Ser. No. 07/731,154, filed Jul. 2, 1991, now abandoned.

I. Field of the Invention

The present invention relates to a positive displacement compressor. More particularly, the present invention relates to a pressure actuated suction and/or discharge valve for use in a positive displacement compressor and in other applications requiring pressure actuated, unhindered flow in one direction and rapid and complete blockage of flow in the opposite direction. In positive displacement compressors, these valves control the flow of gas into and out of the compression chamber and are usually called suction and discharge valves.

II. Prior Art

Conventional suction and discharge valves are pressure actuated, spring loaded check valves containing one or more valve flow control elements. These elements cover flow passages in the valve structure when shut, preventing back flow. When a pressure differential is established in the direction of intended flow, the pressure differential lifts the elements from the flow passage, permitting flow therethrough. Valve spring force is slight and exerts little influence on valve opening.

Various types of valve flow control elements are known for use in compressor valves in common use. A partial list includes: plate, poppet, reed and strip elements. Regardless of type, when the valve is closed, the area of the flow control element exposed to the upstream gas pressure is smaller than the flow control element area exposed to the downstream pressure. This is so because only that portion of the upstream side of the flow control element facing into the flow passage is in contact with the upstream gas. The remaining upstream surface area of the flow control element is in contact with the valve structure adjacent to the flow passage. This area of contact forms the seal to prevent back flow and provides mechanical support for the flow control element when an opposite pressure differential in the direction of the downstream face is present. The whole of the downstream face is exposed to the downstream pressure when the valve is shut. Opening of these pressure actuated valves occurs when the force of the upstream gas pressure operating on the smaller upstream exposed area of the flow control element exceeds the force of the downstream pressure operating on the whole downstream area of the flow control element. The opening pressure differential of such compressor valves therefore depends primarily on the operating pressure of the compressor.

An opening pressure differential of approximately ten percent of the upstream pressure is typically observed with conventional compressor valves. The large pressure imbalance present upon opening causes a high initial flow velocity through the valve. The Bernoulli flow formula predicts a velocity of thirty-eight percent of the speed of sound with a ten percent pressure drop. The almost explosive initial flow causes abrupt pressure changes within the compression chamber and adjacent gas passages that triggers the intense pressure oscillations which can be detected throughout the suction and discharge events. These pressure oscillations increase the work of compression. Also, the variations in gas density associated with the pressure oscillations and their phase angle at valve closing have an effect on the amount of gas delivered. The differential area relationship of the conventional compressor valve thus adversely influences two aspects of compressor performance, mechanical efficiency and predictability or consistency of throughput.

SUMMARY OF THE INVENTION

An object of this invention is to achieve compressor suction and discharge valve opening immediately after pressure reversal, when a minimum of pressure difference is present across the valve. The intent of this is to reduce the intensity of the suction and discharge event pressure oscillations and thereby increase compressor efficiency and reduce capacity variations. Two embodiments of check valves meeting this objective are described. In both cases, the valves differ from the conventional compressor valve in that the area of the flow control element exposed to upstream pressure is equal to the area of the flow control element exposed to downstream pressure, immediately prior to, and at the instant of valve opening. The equal exposed area feature removes the opening pressure dependance of the compressor operating pressure.

In the first embodiment, the valve sealing surface is relocated from its conventional orientation, in the plane of the valve seat, to a surface which is perpendicular to the seat. This new orientation is achieved by sealing on the cylindrical side surfaces of the valve element. None of the sealing area is thus projected onto the upstream or downstream sides of the valve element. The means of establishing an effective seal under an adverse pressure difference while permitting unhindered valve opening and flow is an important teaching of this invention. In the second embodiment, the equal area relationship before and at the instant of valve opening is achieved by the structure of the seal between the valve element and the valve seat. The seal comprises a frusto-conical disc spring, typically referred to as a Belleville spring, that is provided between the valve element and the valve seat. The frusto-conical disc spring may be flattened between the valve element and the valve seat under conditions of high back pressure, but the disc spring lifts the valve element as the pressure difference decreases. The resulting, zero area, line contact between the components provides the desired equal area relationship at pressure reversal and valve opening.

With either of these approaches, the designer is free to choose a low and constant valve opening pressure differential based on the flow control element area and a selected valve spring bias force only.

BRIEF DESCRIPTION OF THE DRAWINGS

FIG. 5 is a partial cross-sectioned view of a discharge and section valve 50 according to the second embodiment of the present invention showing the valve components in the closed condition and with cross-hatching removed for clarity.

FIG. 6 is a cross-sectioned view of the guard 51 for the valve 50 shown in FIG. 5.

FIG. 7 is a cross-sectioned view of a portion of the valve 50 shown in FIG. 5 with the internal components in the opened condition.

FIGS. 8, 9 and 10 are enlarged partial sections of a portion of the valve 50 shown in FIG. 5 and showing the components in the fully closed, closed but ready to open and opened condition, respectively.

Figure 1:
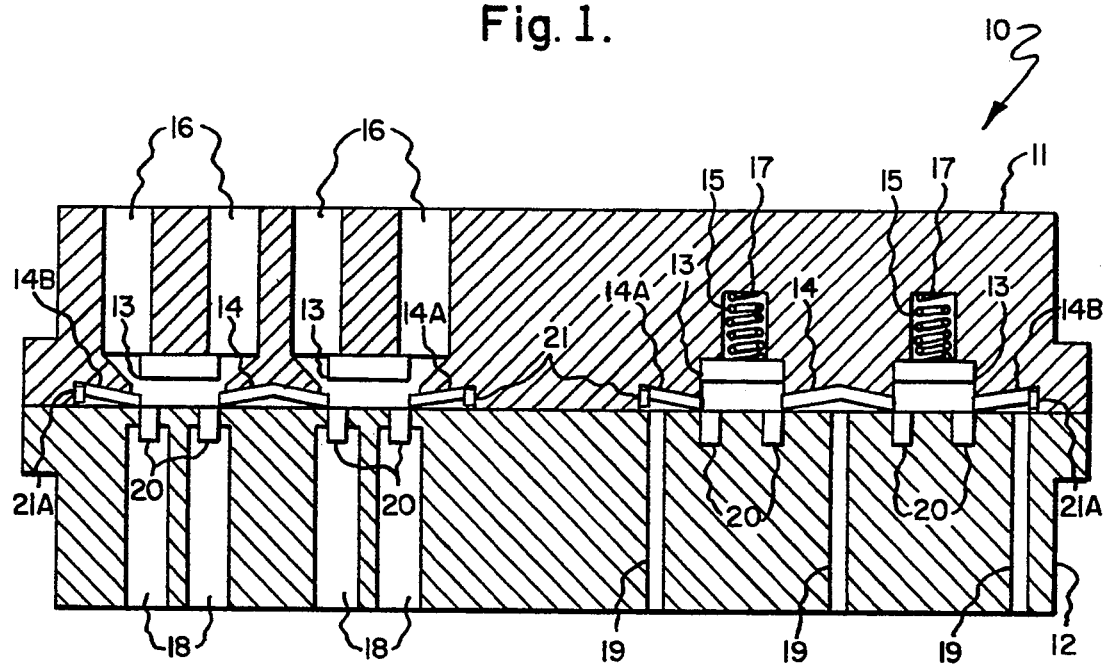
FIG. 1 is a cross-sectioned view of a valve 10 according to the first embodiment of the present invention showing the valve 10 components in the open condition.

The nomenclature used to identify compressor components, including valves, varies with the end use of the compressor. The terms used in the following descriptions will be those in common use in the natural gas compression industry.

DETAILED DESCRIPTION OF THE INVENTION

Referring to FIGS. 1 to 4, the first embodiment of a valve 10 according to the present invention is described as follows:

The valve guard 11 is a rigid metallic disk positioned on the downstream side of the assembly and fixed to a rigid valve seat 12. The guard 11 has exterior features which permit it to fit into the valve pocket of a compressor cylinder (not shown). In addition, guard 11 has gas flow passages 16 which allow the free flow of gas from the region of the flow control elements 13 (FIGS. 1 and 2) and flow control elements 13A (FIG. 3) to the external face of the guard 11. Further, guard 11 has features which position and limit the motion of the flow control elements 13, 13A and the valve seal elements 14, 14A and 14B. Cylindrical pockets 17 are located on the interior surface of the guard 11 to position and restrain the valve springs 15. Those portions of the inner face of the valve guard 11 which are in contact with the valve seat 12 are flat and have a sufficiently fine finish to form a gas seal therebetween.

The valve seat 12 is also a rigid metallic disk with exterior features which permit it to fit into the valve pocket (not shown) of a compressor. Valve seat 12 has gas flow passages 18 which permit the free flow of gas from its exterior face into the annular grooves 20 on the inner surface or face. The annular grooves 20 permit the continued free flow of gas to the inner face of the seat 12 and to the region near the flow control elements 13, 13A. A series of small pressure equalizing holes 19 pass from the exterior face to the inner face of the seat 12 under the valve seal elements 14, 14A and 14B. The inner surface of the valve seat 12 is otherwise flat and has a fine finish so that it can form an efficient gas seal between itself and the valve guard 11 and between the valve seat 12 and the valve seal elements 14, 14A and 14B and supplemental seal rings 21 and 21A.

Figure 2:
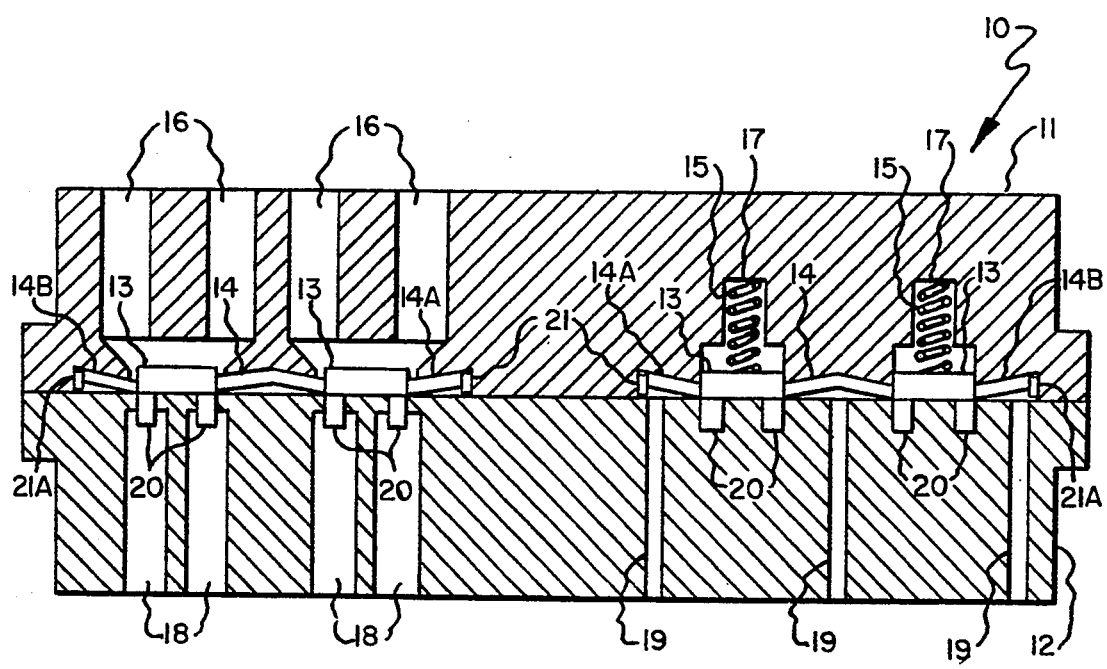
FIG. 2 is a cross-sectioned view of the valve 10 shown in FIG. 1, but with the valve components in the closed position.
Figure 3:
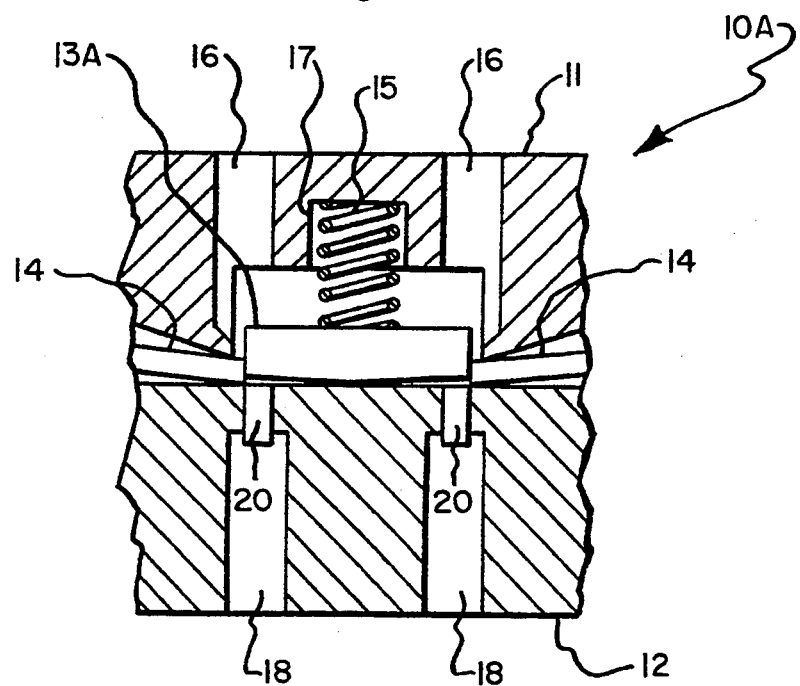
FIG. 3 is a fragmented cross-sectioned view of a poppet or disk type valve 10A of the first embodiment of the present invention with the valve 10A in the closed condition.

The flow control elements 13 are ring shaped members (FIGS. 1 and 2), or they can comprise disc shaped members 13A (FIG. 3). In any event, they are rigid metallic or non-metallic components. In the case of the ring shaped flow control elements 13, the surface facing the valve seat 12 is in the form of a segment of a large radius torus, and in the form of a large radius annular segment for the disk shaped flow control element 13A. The outer surface of the disk shaped flow control element 13A and the inner and outer surfaces of the ring shaped flow control element 13 are cylindrical and have a surface finish suitable for forming a gas seal with the respective mating seal elements 14, 14A and 14B when the valve 10 is in the closed position (FIG. 2).

The valve seal elements 14, 14A and 14B are flexible ring shaped metallic or non-metallic components with a cross-section in the form of a shallow arch or a shallow "V" as indicated at 14, or a shallow half arch or shallow dished washer section 14A and 14B. They are made to undergo controlled elastic deformation during operation. That is, these elements deform under an applied load and return to their original shape when the load is removed.

The valve seal elements 14, 14A and 14B have features which permit their concentric location with respect to their adjacent flow control elements 13, 13A. The inner and outer circumferential surfaces of the seal elements 14 are cylindrical while the inner and outer surfaces of sealing elements 14A and 14B are rounded. All surfaces have a sufficiently fine finish to form a gas seal with their adjacent components. In their undeformed, as manufactured condition, the respective inner and outer surfaces of the valve seal elements 14, 14A and 14B form a close sliding fit with their adjacent components. Thus, as shown in FIGS. 1 and 2 and with respect to the longitudinal axis of the guard 11 and valve seat 12, the inner rounded surfaces of the inner valve seal element 14A forms a sliding fit with the outer surface of the supplemental seal ring 21 and the outer surface of the seal element 14A forms a sliding fit with the inner diameter of the inner valve flow control element 13. Likewise, the inner and outer circumferences of the valve seal element 14 form sliding fits with the outer and inner diameters of their adjacent valve flow control elements 13, respectively. Finally, the inner diameter of the outer valve seal element 14B forms a sliding fit with the outer diameter of the outer valve flow control element 13 and the outer diameter of that valve seal element forms a sliding fit with the inner diameter of the supplemental seal ring 21A.

The supplemental seal rings 21 and 21A are flexible, metallic or non-metallic components with a rectangular cross-section. The surface finish of these components is sufficiently fine to form a gas seal with their mating components. These supplemental seal rings 21 and 21A are used in conjunction with the half arch valve seal elements 14A and 14B. The outer diameter of the ring 21 fits slidably with the inner diameter of valve seal element 14A and the inner diameter of ring 21A fits slidably with the outer diameter of valve seal element 14B.

The valve springs 15 are coil springs with selectable rate and preload which are located in the spring pockets 17 of the valve guard 11. The free end of the springs 15 contact the ring shaped flow control elements 13 (FIGS. 1 and 2) and disk shaped flow control elements 13A (FIG. 3), tending to move them toward the valve seat 12.

Additional sets of similar nested valve components are possible. As shown in FIG. 3, the simplest valve might consist of a single plate or popper valve flow control element 13A and its associated valve seal elements 14 while larger valves such as those shown in FIGS. 1 and 2 might include three or more sets of flow control and seal elements and their related components and features.

Referring to FIGS. 1 to 4, the operation of valve 10 is as follows:

With the valve 10 open as shown in FIG. 1, and with gas flowing through the valve 10, the flow control elements 13 are lifted to a position near the lift stops. Gas enters the upstream face of the valve seat 12 through the flow ports 18 and into the annular grooves 20. It then passes into the space between the valve seal elements 14, 14A, 14B and the lifted flow control elements 13 and then on to the downstream face of the valve guard 11 through the guard flow passages 16.

The upstream and downstream pressures are also approximately equal because of the relatively large and unhindered flow path presented by the lifted valve flow control elements 13. The lack of pressure difference allows the valve seal elements 14, 14A and 14B to assume their un-deformed shape.

At this time and throughout the operating cycle of the valve 10, the pressure in the space between the interior surface of the valve seat 12 facing the valve seal elements 14, 14A, 14B, is equalized with the upstream pressure through the equalizing holes 19 located in seat 12.

When the gas velocity through the valve decreases, the valve springs 15 push the flow control elements 13 toward the valve seat 12. At very low flow rates, i.e., when the compressor piston is about to reverse its direction of motion, the springs 15 force the flow control elements 13 into sliding engagement with their associated and still unstressed and undistorted valve seal elements 14, 14A, 14B. For practical purposes, the valve is closed at this time.

Referring now to FIG. 2, reversal of compressor piston motion tends to cause the flow direction through the valve to reverse. The potential flow path is however blocked by the sliding engagement of the flow control elements 13 with their respective seal elements 14, 14A, 14B. When the flow control elements 13 come to a stop against the valve seat 12, a pressure difference develops across the valve, with the higher pressure on the downstream or guard 11 side of the system and the lower pressure on the upstream or valve seat 12 side. The space between the inner surface of valve seat 12 facing the valve seal elements 14, 14A and 14B and the adjacent inner surface of the valve seat 12 is equalized with the upstream pressure through holes 19 as described above. The pressure on the guard 11 side of the seals 14, 14A and 14B is thus higher than the pressure on the opposite valve seat 12 side.

Figure 4:
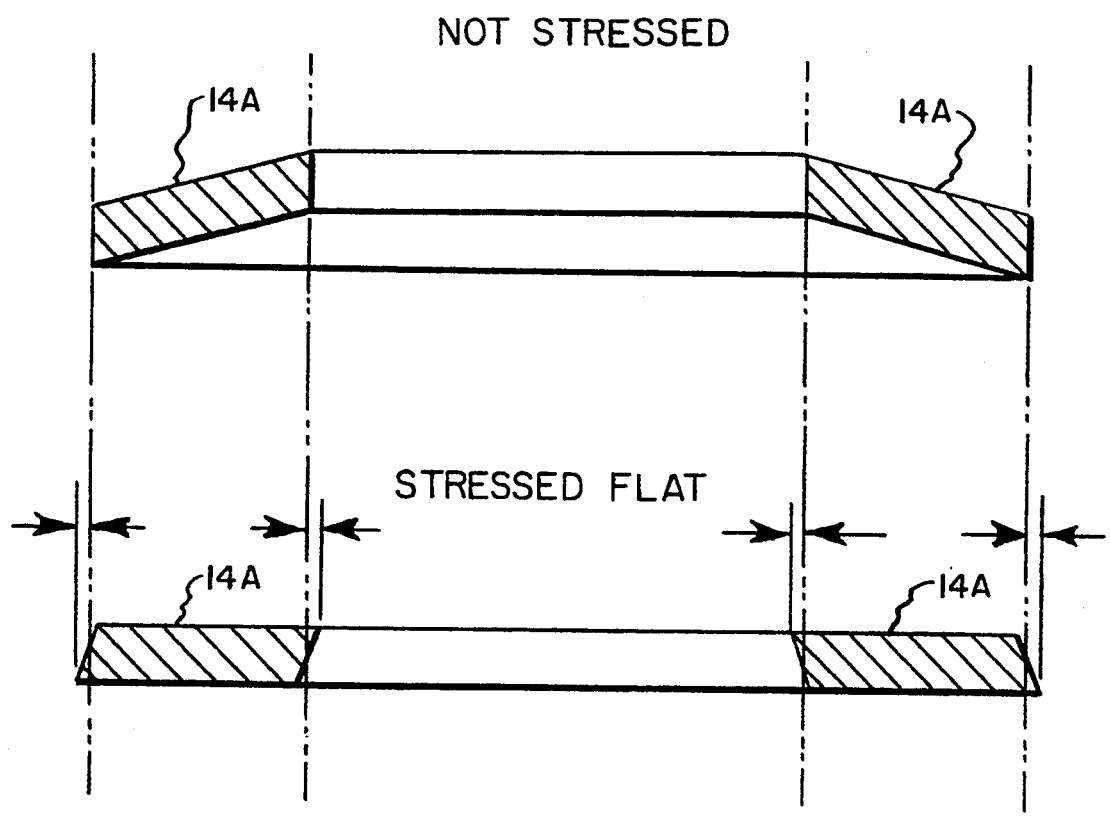
FIG. 4 is an exaggerated view of the seal elements comprising the first embodiment during valve operation.

A uniformly distributed gas force is thus exerted on the valve seal elements 14, 14A and 14B, tending to flatten them elastically against the surface of the valve seat 12. As the seals 14, 14A and 14B flatten, their inner diameters decrease and their outer diameters increase as shown in FIG. 4. The effect of this shape change is to close the clearance gap between the seals 14, 14A and 14B and the adjacent flow control elements 13 or supplemental seal rings 21 and 21A, producing an effective gas seal at these interfaces. The required sealing for the valve in the closed or checked condition is completed when the higher pressure on the guard 11 side of the system forces both the seal elements 14, 14A and 14B and the seal rings 21 and 21A into sealing contact with the inner surface of the valve seat 12. An increase in pressure differential in the check direction tends to cause the sealing elements 14, 14A and 14B to come more forcefully into contact. Effective sealing is thus assured over the operating range of the valve.

Later in the compression cycle, the upstream and downstream pressures on the valve again become equal, in advance of the next opening event. As this happens, the uniformly distributed gas force which had flattened the seal elements 14, 14A and 14B decreases to zero and the sealing elements return elastically to their undistorted shape. The sliding fit between the seal elements 14, 14A and 14B and the flow control elements 13 is re-established and the flow control elements 13 are free to move.

With other potential constraints eliminated, the start of valve opening is determined by the force balance which includes: in the closing direction, the downstream pressure operating on the downstream area of the flow control elements 13, plus the force of the valve springs 15 on the elements 13 and in the opening direction, the upstream pressure operating on the upstream area of the flow control elements 13. Because the upstream and downstream pressure wetted areas of the flow control elements 13 are equal, the pressure difference across the valve at opening is controlled by the flow area of control elements 13 and the selected valve spring 15 preload force only, and that opening pressure difference remains constant regardless of valve operating pressure.

Referring now to FIGS. 5 to 10, the second embodiment of a valve 50 according to the present invention is described as follows:

The valve guard 51 is a rigid metallic disk positioned on the downstream side of the assembly and is fixed to a rigid valve seat 52. The guard 51 has exterior features which permit it to fit into the valve pocket of the compressor cylinder. In addition, guard 51 has gas flow passages 56 which allow the free flow of gas from the region of flow control elements 53, 53A to the external face of the guard 51. Further, guard 51 has features which position and limit the motion of the flow control elements 53 and 53A and the valve spring seal elements 54A, 54B, 54C. Cylindrical pockets 57 are located on the interior surface of the guard 51 to position and restrain the valve springs 55. Those portions of the valve guard 51 which are in contact with the valve seat 52 when they are fixed together, are flat and have a sufficiently fine finish to form a gas tight seal.

The valve seat 52 is also a rigid metallic disk with exterior features which permit it to fit into the valve pocket (not shown) of a compressor cylinder. Seat 52 has gas flow passages 58 which permit the free flow of gas from its exterior face into the annular groove 59 or cylindrical pocket 59A on the interior face of the seat 52. The annular groove 59 and cylindrical pocket 59A permit the continued free flow of gas to the interior surface or face of the seat 52 to the region near the flow control elements 53, 53A and valve spring seal elements 54A, 54B, 54C. The interior surface of the seat 52 is otherwise flat and smooth so it can form an effective gas seal between the seat 52 and the valve guard 51 and between the seat 52 and the valve spring seal elements 54A, 54B, 54C.

The flow control elements are ring 53 or disk 53A shaped rigid components. The surface of elements 53, 53A facing valve seat 52 are flat and have a surface finish suitable for forming an effective gas seal with the valve spring seal elements 54A, 54B, 54C. The other face of these elements 53 and 53A may be flat or have features which help position it on the valve springs 55.

The valve seal elements 54A, 54B, 54C are shallow frusto-conically shaped, spring components made of spring steel and are commonly called Belleville springs. Their upper and lower surfaces and edges are sufficiently smooth to form an effective gas seal when and where they contact the valve seat 52 and the flow control elements 53, 53A. Seals 54A and 54C are designed to undergo controlled elastic deformation during operation. That is, seal elements 54A to 54C deform under the applied load and return to their original shape when the load is removed. The valve spring seal elements 54A to 54C are positioned between the flow control elements 53, 53A and the valve seat 52 by features in the valve guard 51 such that spring seals 54A to 54C are concentrically located with respect to the flow control elements 53, 53A and the groove 59 and the cylindrical pocket 59A. Spring seals 54A to 54C overlap the inner and outer portion of the flow control elements 53, 53A as can be best seen in FIGS. 8 and 9.

The valve springs 55 are preferably coil springs of selectable rate and preload which are located in spring pockets 57 in the valve guard 51. The free end of the springs 55 contact the flow control elements 53, 53A. Multiple sets of the above components and features can be used to produce larger compressor valves.

The forces exerted by the valve springs 55 on the flow control elements 53, 53A tend to move the flow control elements 53, 53A toward the valve seat 52. These forces are quite small compared with the gas forces and will be disregarded, for clarity sake, in much of the description which follows.

During the operating cycle of valves of this design, the system comprising the flow control elements 53, 53A and the valve spring seal elements 54A, 54B, 54C pass through three separate conditions or configurations. These configurations are: valve fully closed, (FIG. 8), valve shut but prepared for opening (FIG. 9), and valve opened (FIG. 10).

Referring to FIGS. 5 and 7 to 10, the operation of valve 50 is as follows:

With no gas flow and valve 50 in the fully closed position (FIGS. 5 and 8), the gas pressure on the valve guard 51 side of the assembly is substantially greater than the pressure on the valve seat 52 side of the assembly. The higher upstream pressure acts on the whole upper surface of the flow control elements 53, 53A, tending to move them toward the valve seat 52. The gas force on the flow control elements 53, 53A is transmitted to the valve spring seal elements 54A, 54B, 54C causing the spring seals to deflect to the flattened condition against the valve seat 52. An effective area seal is thereby established between the flow control elements 53, 53A and the valve spring seal elements 54A to 54C and between the valve spring seal elements 54A to 54C and the valve seat 52. These areas of contact provide adequate support for the flow control elements during conditions of high gas pressure loading.

The lower pressure which is present on the valve seat 52 side of the assembly exerts a force, in the lifting direction, on those portions of the flow control elements 53, 53A which are not covered by the valve spring seal elements 54A to 54C. The difference between this lifting gas force and the earlier described gas force operating on the whole opposite face of the flow control elements 53, 53A is the net gas force on the flow control elements 53, 53A. The net gas force is distributed over both faces of the valve spring seal elements 54A, 54B, 54C and consists of two components, the force associated with the deflection of the spring seal elements 54A to 54C into the flattened condition, and a uniformly distributed force associated with the remaining unbalanced gas force.

When the valve 50 is prepared for opening (FIG. 9), the pressure difference across the valve assembly decreases and the unbalanced gas force on the flow control elements 53, 53A decreases. When the net gas force becomes smaller than the force of the valve spring seal elements 54A, 54B, 54C in the flat condition, the spring seal elements 54A to 54C lift the flow control elements 53, 53A. The contact interface between the flow control elements 53, 53A and the valve spring seal elements 54A to 54C changes from an area contact to a line contact as this transition occurs. The area of the flow control elements 53, 53A facing the valve seat 52, which is exposed to the pressure on the valve seat 52 side of the system, then becomes equal to the area on the opposite side of the flow control elements 53, 53A, which is exposed to pressure on the valve guard 51 side of the system. This condition persists as the pressure difference across the valve 50 reduces toward zero. The decreasing net gas force on the flow control elements 53, 53A is balanced by the decreasing force of the valve spring seal elements 54A to 54C at the line of contact between them. When the pressures on both sides of the valve assembly are equal, the net gas force on the flow control elements 53, 53A is zero and the valve 50 is thus prepared to open.

With the valve 50 open (FIG. 7 and 10), the pressure difference across the valve assembly reverses, that is, when the pressure on the valve seat 52 side becomes greater than the pressure on the valve guard 51 side, the net gas force on the valve flow control elements 53, 53A becomes positive in the valve lift or opening direction. This force causes the valve flow control elements 53, 53A to lift clear of the valve spring seal elements 54A, 54B, 54C and a gas flow path is established. The valve flow control elements 53, 53A lift within the limits provided by the guide and stop features in the valve guard 51, and the motion of control elements 53, 53A, in time, is determined by their mass, the net gas force and the oppositely directed force of the valve springs 55. The valve seal elements 54 to 54C assume their unstressed shape and are held in place by the positioning and restraining features contained in the valve guard 51. A free and open gas flow path is then established through the valve assembly with gas entering the valve seat 52 through flow passages 58 and passing into the annular groove 59 or cylindrical pocket 59A on the interior of the seat 52. The gas then enters the interior face of the valve guard 51 between the seal elements 54A to 54C and the flow control elements 53, 53A and continues to flow through passages 56 to the exterior face of the guard 51.

When the valve 50 is in the opened condition and gas is flowing, a dynamic pressure difference is developed across the valve assembly which tends to lift the valve flow control elements 53, 53A. This dynamic force is counteracted by the valve spring 55 force on the flow control elements 53, 53A. As the flow rate through the valve decreases, the dynamic gas force diminishes rapidly. The valve spring 55 moves the flow control elements 53, 53A toward their closed condition as the flow event comes to an end.

While this invention has been particularly described in connection with several preferred embodiments thereof, it is to be understood that these embodiments are by way of illustration and not limitation, and the scope of the appended claims should be construed as broadly as the prior art will permit.

What is claimed is:

1. A positive displacement compressor means having pressure actuated suction and/or discharge valve means, which comprises:
   (a) a valve seat means having a first passage for fluid flow;
   (b) a flow control means having a blocking face defined by at least one surrounding edge thereof, wherein the flow control means is movable towards the valve seat means to block the first fluid passage when the valve means is in a closed position;
   (c) housing means having a second fluid passage and being adapted to confine the flow control means in alignment with the first passage of the valve seat means; and
   (d) seal means confined in alignment with the flow control means by the housing means and having a frusto-conical shape providing a convex side facing the valve seat and a concave side extending between an inner and an outer enclosing side wall, the concave side facing both the housing means and the blocking face of the flow control means wherein when the valve means is open the at least one surrounding edge of the flow control means is aligned spaced from and intermediate the inner and outer side walls of the seal means such that the flow control means is movable towards the valve seat means to first contact the seal means at the intermediate position and then leverage the seal means into a flattened condition when the fluid pressure directed against a downstream side of the valve means is greater than the fluid pressure directed against an upstream side of the valve means with the valve means in a closed position to shut off fluid flow communication between the first and second fluid passages.

2. The compressor means of claim 1 wherein the second fluid passage is in communication with the first fluid passage when the valve means is in an open position.

3. The compressor means of claim 1 wherein the flow control means is selected from the group consisting of a ring or a circular disk.

4. The compressor means of claim 1 wherein when the seal means is flattened by the flow control means, the seal means forms a supporting and sealing contact area between itself and the flow control means and between itself and the valve seat means, and wherein when the fluid pressure acting on the flow control means is less than the force required to deflect the seal means into its flattened condition, the seal means provides a biasing force for moving the flow control means to a position spaced from the valve seat means of the valve means.

5. The compressor means of claim 1 wherein a line of sealing contact is formed between the seal means and the flow control means at such time as the flow control means is first moved into contact the seal means at the intermediate position.

6. The compressor means of claim 1 wherein the biasing force provided by the seal means in its flattened condition is selected to assure lifting of the flow control means to a position of line contact between them before the pressure on the upstream side of the valve means becomes larger than the pressure on the downstream side of the valve means.

7. The compressor means of claim 1 wherein a biasing means extends from the housing means and serves to urge the flow control means toward the valve seat means.

8. A positive displacement compressor means having a pressure actuated suction and/or discharge valve means, which comprises:
   (a) a valve seat means having a first passage for fluid flow;
   (b) a flow control means having an upstream, blocking face and a downstream face, both faces extending to and meeting with at least one surrounding side wall thereof to provide a uniform cross-section between the faces, wherein the flow control means is movable towards the valve seat means to block the first fluid passage when the valve means is in a closed position;
   (c) a housing means having a second fluid passage and being adapted to confine the flow control means in alignment with the first fluid passage of the valve seat means; and
   (d) a seal means confined in alignment with the flow control means by the housing means and having a frusto-conical shape providing a convex side facing the valve seat and a concave side extending between an inner and an outer enclosing side wall, the concave side facing both the housing means and the blocking face of the flow control means, wherein when the valve means is open the at least one surrounding side wall of the flow control means is aligned spaced from and intermediate the inner and outer enclosing side walls of the seal means such that when the valve means is first in a closed position with the fluid pressure directed against a downstream side of the valve means being greater than the fluid pressure directed against an upstream side of the valve means and with an enclosing edge of the flow control means provided at a junction of the surrounding side wall and the blocking face contacting the seal means at the intermediate position, but before the seal means has started to deflect into a flattened position, the area on the blocking face of the flow control means subject to upstream pressure is equal to the area on its downstream face exposed to downstream pressure.

9. The compressor means of claim 8 wherein the second fluid passage is in communication with the first fluid passage when the valve means is in an open position.

10. The compressor means of claim 8 wherein when the seal means is flattened by the flow control means, the seal means forms a supporting and sealing contact area between itself and the flow control means and between itself and the valve seat means, and wherein when the fluid pressure acting on the flow control means is less than the force required to deflect the seal means into its flattened condition, the seal means provides a biasing force for moving the flow control means to a position spaced from the valve seat means of the valve means.

11. The compressor means of claim 8 wherein a line of sealing contact is formed between the seal means and the flow control means at such time as the flow control means is first caused to contact the seal means at the intermediate position.

12. The compressor means of claim 8 wherein the biasing force provided by the seal means in its flattened condition is selected to assure lifting of the flow control means to a position of line contact between them before the pressure on the upstream side of the valve means becomes larger than the pressure on the downstream side of the valve means.

13. The compressor means of claim 8 wherein a biasing means extends from the housing means and serves to urge the flow control means toward the valve seat means.

* * * * *